No. 669,083. Patented Mar. 5, 1901.
L. HACHENBERG.
WEIGHING SCALE.
(Application filed July 29, 1899.)
(No Model.) 2 Sheets—Sheet 1.
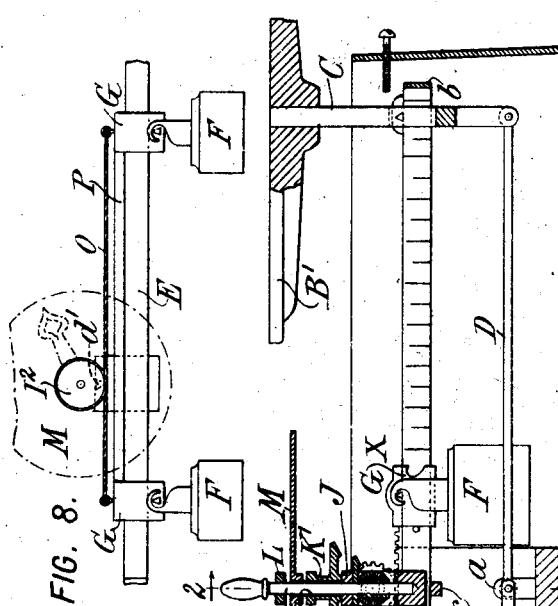
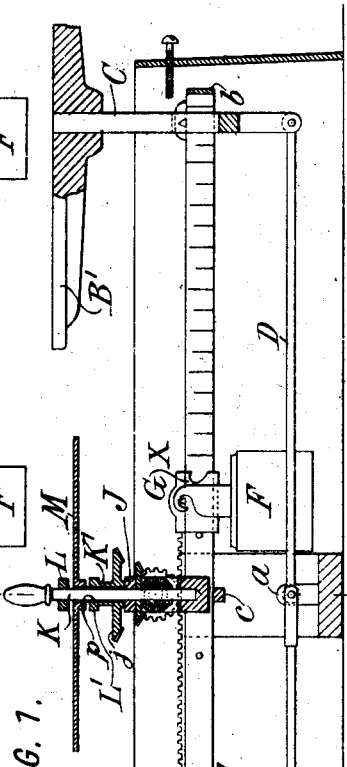
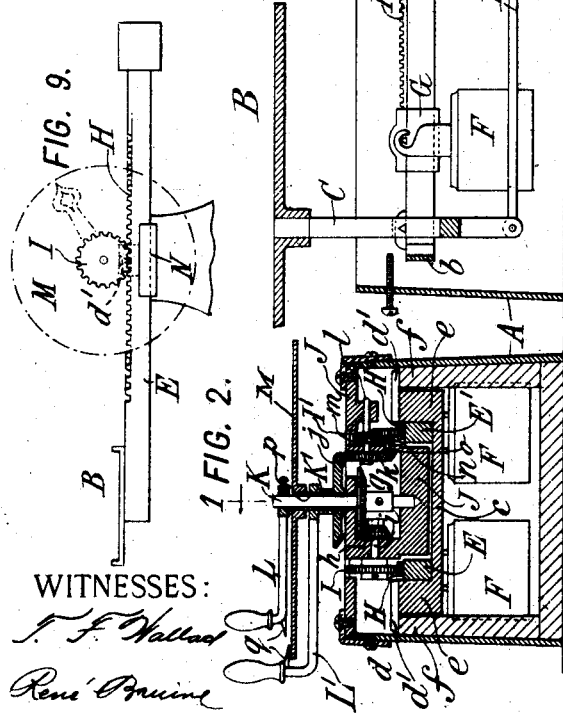
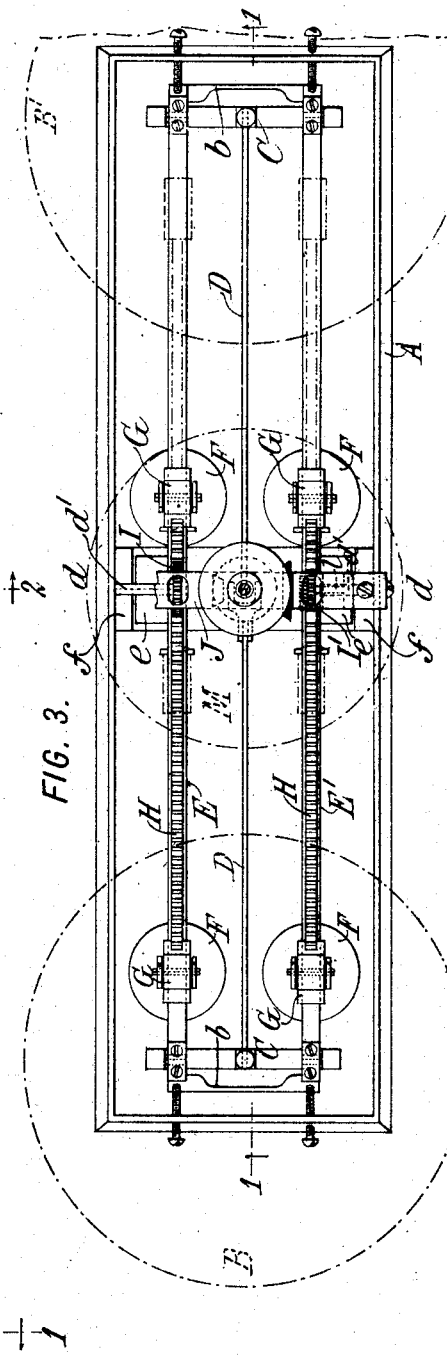
WITNESSES:
INVENTOR:
Louis Hachenberg
By his Attorneys, No. 669,083. Patented Mar. 5, 1901.
L. HACHENBERG.
WEIGHING SCALE.
(Application filed July 29, 1899.)
(No Model.) 2 Sheets—Sheet 2.
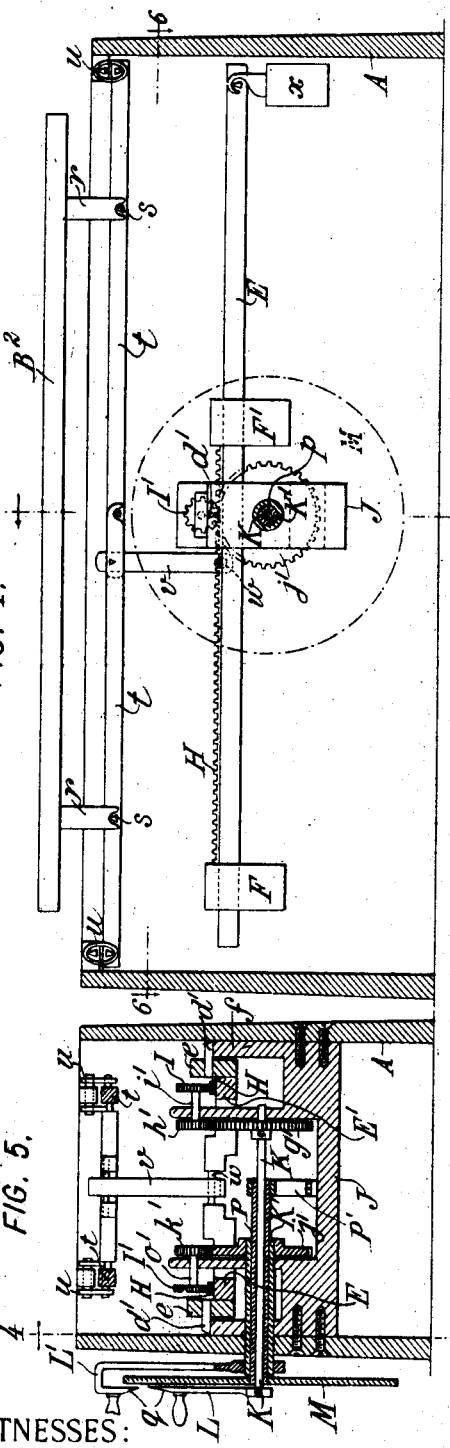
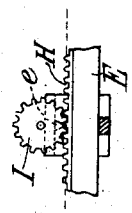
WITNESSES:
INVENTOR:
Louis Hachenberg
By his Attorneys.

UNITED STATES PATENT OFFICE.

LOUIS HACHENBERG, OF NEW YORK, N. Y.

WEIGHING-SCALE.

SPECIFICATION forming part of Letters Patent No. 669,083, dated March 5, 1901.

Application filed July 29, 1899. Serial No. 725,477. (No model.)

*To all whom it may concern:*

Be it known that I, LOUIS HACHENBERG, a citizen of the United States, residing in the city, county, and State of New York, have invented certain new and useful Improvements in Weighing-Scales, of which the following is a specification.

This invention relates to weighing-scales of that class in which a balance-beam is employed. In the common form of this class of scales the balance is obtained by shifting the poise by hand along the notched scale-beam until the poise has been adjusted to the proper position to balance the article to be weighed. In this operation the thrust imparted to the poise necessarily disturbs the balance of the beam and considerable time is lost at each adjustment of the poise before the beam reaches a position of equilibrium.

It is the object of my invention to provide a scale wherein the shifting of the center of gravity of the beam to counterpoise the weight to be weighed may be accomplished without imparting to it any tendency to tilt or vibrate, whereby when the action of such means has effected the proper adjustment of the center of gravity to bring the beam to a position of equipoise the beam immediately assumes this position and comes to rest without disturbing fluctuations and without loss of time.

To this end my invention provides a weighing-scale having mechanism mounted independently of the beam for actuating any suitable means for displacing its center of gravity, and thereby restoring its balance. The means for varying the center of gravity of the beam may consist of the usual poise or poises, and the actuating means therefor acts against such poise or equivalent means at a point as nearly as possible coincident with the axis on which the beam is fulcrumed in order that the thrust imparted to the poise shall have no tendency to disturb the beam or throw it into vibration.

My invention also consists in certain novel features of construction and arrangement of parts, all of which will be hereinafter more fully pointed out.

My invention is capable of various embodiments, some of which I have illustrated in the accompanying drawings, in which—

Figure 1 is a vertical longitudinal section of the preferred form of my invention as applied to a double-plate scale, taken on the lines 1 1, Figs. 2 and 3. Fig. 2 is a cross-section thereof on the line 2 2, Fig. 1. Fig. 3 is a plan thereof with the scale-plates and graduated scale or dial removed. Fig. 4 is a vertical longitudinal section of the preferred form of the invention as applied to a single-plate or platform scale, taken on the lines 4 4, Figs. 5 and 6. Fig. 5 is a cross-section thereof on the line 5 5, Fig. 4. Fig. 6 is a horizontal section thereof, taken on the line 6 6, Fig. 4. Fig. 7 is a detail, and Figs. 8 and 9 are views showing modifications.

Referring first to Figs. 1, 2, 3, and 7, which show the preferred form of my invention as applied to a scale having two plates or pans, let A indicate a frame; B B', the scale-plates; C, their upright supporting-frames, and D the parallel-motion links or levers for maintaining the supporting-frames in a substantially vertical position. These parts may be of any suitable construction, depending upon the use for which the scale is designed, the plates B B' being screwed or otherwise connected to the frames C, and the links or levers D being pivoted at their outer ends to the lower ends of said frames and at their inner ends to a suitable projection $a$, all as usual.

I prefer to employ a scale-beam having two members E E' and connect said members at their ends by the cross-braces $b\,b$ and at their middles by a brace $c$, so that each may carry a separate poise or poises and one may be used as a tare-beam as will be hereinafter described. The beam is fulcrumed at $d$, preferably by the knife-edges $d'$, carried by suitable knife-blocks $e$, secured to the middles of the members E E', the knife-edges resting on bearing-blocks $f$, secured to the sides of the frame. Any suitable form of fulcrum-pivots may be substituted for the knife-edges, especially where a great degree of delicacy is not essential. Each member of the beam carries a poise or poises F, preferably two, as shown, one of which is arranged at each side of the fulcrum of the beam. The poises F of each member are preferably mounted on knife-edges carried by slides or carriers G, which latter are connected to move together by a rack H, which is shown as sliding upon the upper face or edge of each beam. The normal position of the poises when the scale is empty may be at one end of the beam, as shown, the plate B' being weighted to serve as a counterpoise, so that the beam balances when the poises are in this position. Their normal position may, however, be equidistant from the fulcrum-axis, in which case the plates B and B' may be of equal weight.

To move the poises to perform the weighing operation, I prefer to employ pinions I I', which mesh with the racks H of each beam and move them along the beams to obtain the desired balance. It is an essential part of my invention that the actuating means for moving the poises shall be independent of the movements of the beam, and it is also important that the beam should be free from frictional contact except at its fulcrum, so that the scale may be free to respond to the slightest variation in weight and accurate results may be obtained. This I accomplish in the present construction by mounting the pinions I I' independently of the beam, preferably in a cross-frame J, fixedly secured to the frame A, the parts being so arranged that the pitch-line of the rack and pinion is substantially coincident with the fulcrum-axis of the beam, as shown in detail in Fig. 7. By this means the pinion may be rotated to move the rack without having any effect to tilt the beam, while at the same time the beam may move through its range of movement without either turning the pinion or having any undue frictional contact therewith. It will of course be understood that a toothed sector may be substituted for the pinions I I' in this construction with the same effect, although I prefer to use the pinions because they may be made considerably smaller than would be possible were sectors employed.

The pinions I I' may be so formed as to be conveniently rotated directly by hand; but by preference I provide suitable operating mechanism, that shown consisting of shafts K K', which are mounted vertically in the frame J and extend above the frame A a short distance, each being provided at its upper end with a suitable handle. I preferably provide levers L L', which may carry handles or knobs, as shown. The shaft K preferably extends through the shaft K' and carries at its lower end the beveled gear $g$, which meshes with a gear $h$, carried by the shaft $i$, upon which the pinion I is mounted. The shaft K' carries the gear $j$, which meshes with a gear $k$, carried by an intermediate shaft $l$, which also carries a gear $m$, meshing with a pinion $n$, carried by the shaft $o$, upon which the pinion I' is mounted. The gears for each pinion are preferably so proportioned that one rotation of the handle or lever L L' will effect the movement of the rack H through its entire range of motion.

My invention contemplates the use of a graduated scale or other means for indicating the movements of the poises and the weights corresponding to such movements, and preferably a pointer is employed in connection with such scale, one part being arranged to move with reference to the other. Preferably the graduated scale is stationary and the pointer traverses it according to the position of the poise. This may be done in various ways—as, for instance, the scale-beam may be graduated, as is now common, this being shown at X in Fig. 1, the poise carrier or slide G serving as a pointer. It is preferable, however, that one graduated scale should serve for indicating the weight for both members of the beam, and this is best done by a dial M, which is shown as fixed with relation to the frame A, as by being secured to the upper end of a sleeve $p$, which is mounted in the frame J. The sleeve $p$ extends through and forms a bearing for the shaft K', and the dial M is arranged on said sleeve above the lever L' and below the lever L. The levers L L' are preferably provided with pointers $q$, which move over the graduations of the dial, to indicate the weight upon each member of the beam.

In operation if it is desired to find the weight of an article it is placed on the plate B and either one of the levers L L' moved around the dial until the balancing position is reached. For very rapid and accurate weighing the slight excess of movement necessarily made in overcoming the inertia of the load may be corrected by a slight movement of the lever in the reverse direction. The hand may be kept upon the lever without danger of affecting the balance in the slightest degree, and no particular care need be exercised in operating the lever. No repeated adjustments of the weights are necessary, as is now the case, and the weighing operation may be easily and rapidly performed. If the poises moved by one lever are insufficient for the weight of the article, the other lever may be then operated, the weight of the article being determined by combining the weights indicated by both pointers. If it is desired to obtain a certain weight of material, one or both of the levers are moved to the indicated weight, when the material may be supplied until the scale balances.

The form of my invention embodied in the construction just described is particularly adapted for taking tare-weights, the receptacle or package being first balanced by operating one lever, when the other lever may be moved to the indicated weight and the material supplied until the balance is obtained.

In Figs. 4, 5, and 6 I have shown my invention as applied to a platform-scale. In this construction the plate or platform $B^2$ is carried by supports $r$, which rest on knife-edges $s$, carried by pivoted platform-levers $t$, which are themselves supported from the frame A by links $u$. When weight is applied to the platform, the levers $t$ act to depress the scale-beams E E' through the medium of a connecting-rod $v$, acting upon a knife-edge $w$, carried by the beams in a well-known manner. In this construction the beam is fulcrumed at its middle, and the normal position of the poises F may be to the extreme left, the balance being maintained by counterpoises $x$. The weight upon the platform $B^2$ acts against the weight of the counterpoises, and the poises F are displaced to an extent sufficient to balance the beam. In this construction the dial and operating-levers may be conveniently located at the side of the frame, if desired, instead of at its top, the shaft K extending through the dial and carrying a gear $g'$, which meshes with a gear $h'$, carried upon the pinion-shaft $i'$, and the shaft K' extending from the inner side of the dial and rotating a gear $j'$, which meshes with a gear $k'$, carried upon the pinion-shaft $o'$. The dial M is fixed to the sleeve $p$, which is held against rotation by a support or brace $p'$, secured to the frame J. The pinions I and I' are mounted in the same manner and bear the same relation to the racks H as in the construction described with reference to Figs. 1, 2, and 3. In the construction just described the gearing for operating each pinion is somewhat simplified, due to the location of the dial and operating-levers at the side of the frame. It will be understood, however, that the location of these parts is a matter of preference and that they may be placed wherever desired or wherever is most convenient for the particular form of scale to which my invention is applied.

While I have shown and described the preferred form of my invention, it will be understood that I do not wish to be limited to the constructions described, as my invention is capable of a wide degree of modification without departing from its essential features. For example, while I have applied the term "poise" in the constructions described to a weight carried by the beam I wish to be understood by this term to refer to any means for effecting the balance of the beam or, in other words, any means for restoring its center of gravity to its fulcrum-axis against the weight of the article to be weighed. In Fig. 9 I have shown such a modification of my invention in which the scale-beam is itself movable to restore such balance. In this figure the scale-beam E slides in a frame N, which is hung on knife-edge pivots, the rack H being here formed as a part of or secured to the beam. The pinion I operates in substantially the same manner as before and slides the beam along the frame N until the center of gravity is again brought to the fulcrum-axis, when the beam will balance. In this construction it is desirable that the free end of the beam should be weighted, as shown. Nor is it essential to my invention to employ a rack and pinion, as any means may be employed which will actuate the poise independently of the movements of the beam. It is preferable that this should be effected without undue friction upon the beam, and although I prefer the rack-and-pinion mechanism for this purpose I have shown a modified form of such means in Fig. 8, which may be employed, if desired. In this construction the poises are actuated by means of a chain or cord O, which passes around a wheel $I^2$, the poises being held apart by a rod P. By this means the point of tangential engagement of the wheel with the chain or cord may be substantially coincident with the fulcrum-axis of the beam, as shown. Nor is it absolutely essential that a rotary member should be employed to move the rack, although such a member is preferable; but any suitable means for accomplishing this result may be used.

While I have shown the invention as applied to a scale in which the beam comprises two members each carrying two poises, it will of course be understood that a single beam or one having three or more members may be employed and that the poises may be of any number desired. These modifications and others of a like character are within my invention, the most important feature of which is the combination, with a scale having a beam and means for restoring its balance against the weight of an article, of an actuating mechanism adapted for manual operation, so that it may respond to the intelligence of the operator, such mechanism being mounted independently of the movements of the beam and acting against such means at a point substantially coincident with the fulcrum-axis of the beam, so that its operation will not disturb the beam.

I believe myself to be the first to provide a scale with means by which the poise may be moved from any position along the beam without disturbing the latter and which is specially adapted for operation by hand in effecting such movement in either direction lengthwise of the beam.

What I claim is—

1. In a weighing-scale, the combination with the beam, and means for varying its center of gravity, of a hand-operated actuating part mounted independently of the beam and acting against said means at a point substantially coincident with the fulcrum-axis of the beam.

2. In a weighing-scale, the combination of the beam and means for varying its center of gravity, with an actuating part for operating said means mounted independently of the beam, and acting against said means at a point substantially coincident with the fulcrum-axis of the beam, so that its action does not disturb the beam, having an operating-handle to adapt it for manual operation, and being free to impart motion to said means in either direction during weighing, or to produce a predetermined variation of the center of gravity of the beam before adding the load.

3. In a weighing-scale, the combination of a beam and poise, with actuating means for shifting said poise mounted independently of the beam and acting against the poise at a point substantially coincident with the fulcrum-axis of the beam, so that its action does not disturb the beam, having an operating-handle to adapt it for manual operation and being free to impart motion to the poise in either direction during weighing, or to set the poise to a predetermined point before adding the load.

4. In a weighing-scale, the combination of the beam, a poise movable thereon, a hand-operated actuating means mounted independently of the beam, and comprising a rotative part, and a longitudinal connection carried by the beam for communicating the movement of said rotative part to the poise, arranged to be tangentially engaged by said rotative part coincidently with the fulcrum-axis of the beam, whereby the thrust imparted by said part has no effect to tilt the beam.

5. In a weighing-scale, the combination with the beam, and a poise movable thereon, of a hand-operated actuating part adapted for moving said poise to a predetermined point on said beam, said actuating part being mounted independently of said beam and connected to said poise at a point coincident with the fulcrum-axis of said beam, and a graduated scale and pointer, the one moved past the other by said actuating part for indicating the weight.

6. In a weighing-scale, the combination of the beam, a poise movable thereon, a hand-operated actuating means mounted independently of the beam, and comprising a rotative pinion, and a longitudinal rack carried by the beam for communicating the movement of said pinion to the poise, said rack and pinion arranged with the meeting-point of their pitch-lines substantially coincident with the fulcrum-axis of the beam, whereby the thrust imparted by said pinion has no effect to tilt the beam.

7. In a weighing-scale, a frame, a beam fulcrumed thereto a rack carried by said beam, a poise moved by said rack along said beam, a pinion mounted in bearings in said frame, engaging said rack at a point substantially coincident with the fulcrum-axis of the beam, a handle for moving said pinion, a graduated scale, and means operated by said handle for indicating the movements of said poise upon said scale.

8. In a weighing-scale, a frame, a dial fixed upon the side thereof, a beam fulcrumed in said frame, a rack carried by said beam, a poise moved by said rack along said beam, a pinion mounted in said frame and engaging said rack at a point substantially coincident with the fulcrum-axis of the beam, a shaft for turning said pinion extending through said dial and having an operating-handle.

In witness whereof I have hereunto signed my name in the presence of two subscribing witnesses.

LOUIS HACHENBERG.

Witnesses:
EUGENE V. MYERS,
THOMAS F. WALLACE.